United States Patent
Sugiura

(10) Patent No.: US 8,841,039 B2
(45) Date of Patent: Sep. 23, 2014

(54) INDIRECT INTERNAL REFORMING SOLID OXIDE FUEL CELL SYSTEM

(75) Inventor: Yukihiro Sugiura, Kanagawa (JP)

(73) Assignee: Nippon Oil Corporation (JP)

( * ) Notice: Subject to any disclaimer, the term of this patent is extended or adjusted under 35 U.S.C. 154(b) by 0 days.

(21) Appl. No.: 13/338,584

(22) Filed: Dec. 28, 2011

(65) Prior Publication Data

US 2013/0011758 A1    Jan. 10, 2013

Related U.S. Application Data

(62) Division of application No. 12/307,520, filed as application No. PCT/JP2007/062250 on Jun. 18, 2007, now abandoned.

(30) Foreign Application Priority Data

Jul. 5, 2006   (JP) .................................. 2006-185444

(51) Int. Cl.
| | |
|---|---|
| *H01M 8/06* | (2006.01) |
| *H01M 8/04* | (2006.01) |
| *H01M 8/10* | (2006.01) |
| *H01M 8/12* | (2006.01) |
| *H01M 8/24* | (2006.01) |

(52) U.S. Cl.
CPC .......... *H01M 8/1246* (2013.01); *H01M 8/0625* (2013.01); *Y02E 60/521* (2013.01); *H01M 8/2475* (2013.01); *Y02E 60/525* (2013.01); *H01M 8/0618* (2013.01); *H01M 8/04089* (2013.01); *H01M 8/04007* (2013.01); *H01M 8/04223* (2013.01)
USPC ........... 429/425; 429/423; 429/433; 429/479; 429/429

(58) Field of Classification Search
USPC ........................................................ 429/433
See application file for complete search history.

(56) References Cited

U.S. PATENT DOCUMENTS

| | | | |
|---|---|---|---|
| 2004/0038095 A1* | 2/2004 | Kushibiki et al. ................ | 429/20 |
| 2005/0196653 A1* | 9/2005 | Haltiner et al. .................. | 429/19 |

(Continued)

FOREIGN PATENT DOCUMENTS

| | | |
|---|---|---|
| CN | 1567633 A | 1/2005 |
| EP | 0384944 A1 | 9/1990 |

(Continued)

OTHER PUBLICATIONS

Office Action for Chinese Application No. 200780025338.0 issued Jun. 30, 2010 with English translatioon.

(Continued)

*Primary Examiner* — Ula C Ruddock
*Assistant Examiner* — Matthew Van Oudenaren
(74) *Attorney, Agent, or Firm* — Cantor Colburn LLP

(57) ABSTRACT

The indirect internal reforming solid oxide fuel cell system includes an indirect internal reforming solid oxide fuel cell that has a first reformer which produces a reformed gas from a hydrocarbon-based fuel by using a steam reforming reaction, a solid oxide fuel cell which generates electric power by using the reformed gas obtained in the first reformer, and a container which houses the first reformer and the solid oxide fuel cell, the first reformer being disposed in a position to receive heat radiation from the solid oxide fuel cell; a second reformer which is disposed outside the container and produces a reformed gas by reforming a hydrocarbon-based fuel; and a line which leads the reformed gas obtained in the second reformer from the second reformer to an anode of the solid oxide fuel cell.

10 Claims, 1 Drawing Sheet

(56) References Cited

U.S. PATENT DOCUMENTS

| | | | |
|---|---|---|---|
| 2006/0057444 A1* | 3/2006 | Takagi et al. | 429/20 |
| 2007/0042239 A1* | 2/2007 | Chang et al. | 429/19 |

FOREIGN PATENT DOCUMENTS

| | | | | |
|---|---|---|---|---|
| EP | 0476610 | A2 | 3/1992 | |
| EP | 1047144 | * | 10/2000 | H01M 8/04 |
| EP | 1408572 | A2 | 4/2004 | |
| JP | 4-101364 | A | 4/1992 | |
| JP | 4-129174 | A | 4/1992 | |
| JP | 6-104000 | A | 4/1994 | |
| JP | 2002-358997 | A | 12/2002 | |
| JP | 2003-123818 | A | 4/2003 | |
| JP | 2004-515033 | A | 5/2004 | |
| JP | 2005-158527 | A | 6/2005 | |
| JP | 2005158527 | | * 6/2005 | H01M 8/04 |
| TW | 385568 | B | 3/2000 | |
| TW | I220804 | B | 9/2004 | |
| TW | I226872 | B | 1/2005 | |
| TW | I257191 | B | 6/2006 | |
| WO | 02/11226 | A3 | 2/2002 | |

OTHER PUBLICATIONS

Extended European Search Report for Application No./Patent No. 07745481.7-2118/2040325, dated Oct. 7, 2011.

International Search Report for International Application No. PCT/JP2007/062250 mailed Aug. 28, 2007 with English Translation.

United States Patent and Trademark Office Communication, Non-Final Rejection for U.S. Appl. No. 12/307,520, notification date of Mar. 23, 2011.

United States Patent and Trademark Office Communication, Final Rejection for U.S. Appl. No. 12/307,520, notification date of Oct. 19, 2011.

Taiwanese Office Action for Taiwanese Application No. 1022058016001, dated May 8, 2013, with English translation.

Korean Office Action for Korean Patent Application No. 10-2009-7002206, dispatched Sep. 30, 2013, with partial English translation.

* cited by examiner

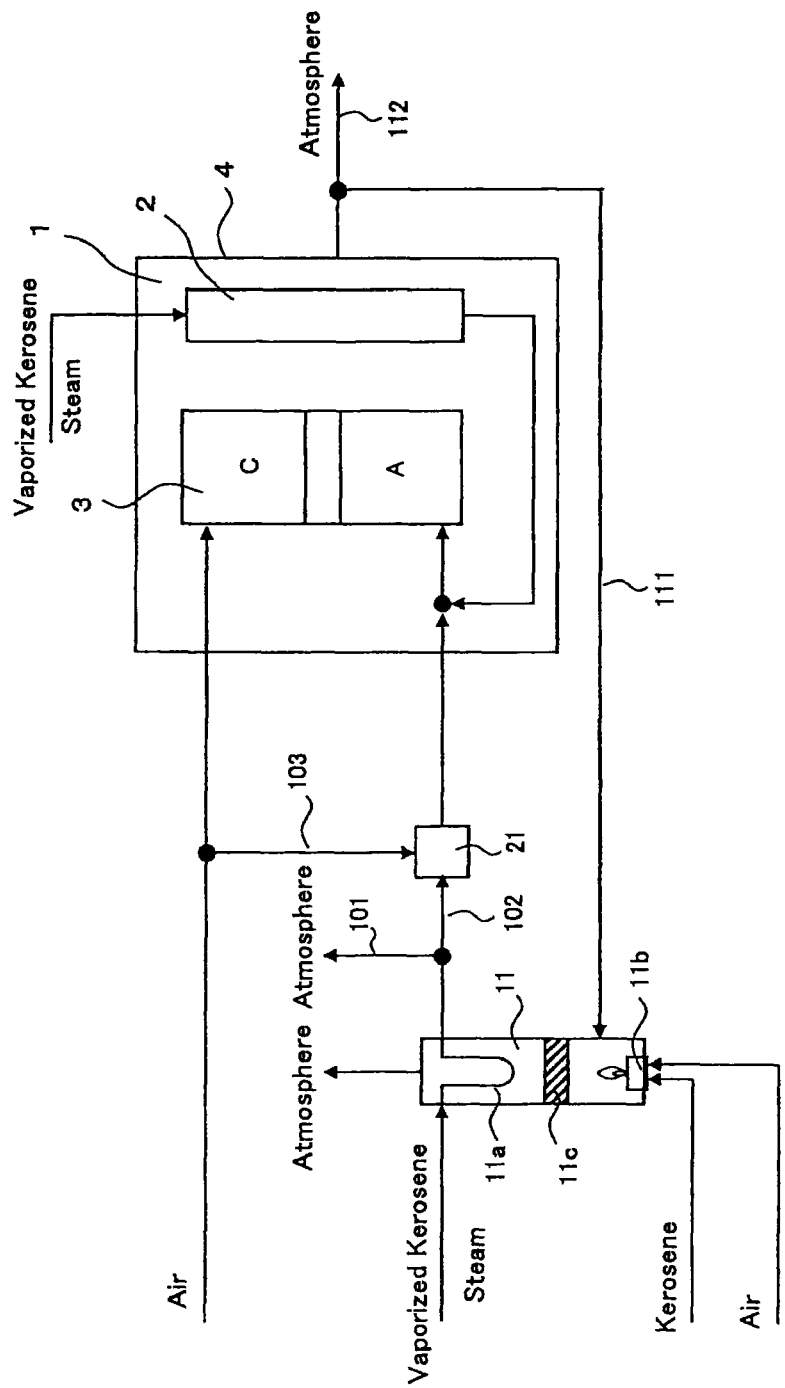

INDIRECT INTERNAL REFORMING SOLID OXIDE FUEL CELL SYSTEM

CROSS REFERENCE TO RELATED APPLICATIONS

The present application is a divisional application of U.S. patent application Ser. No. 12/307,520, filed on Jan. 5, 2009, the entire contents of which are incorporated herein by reference. The Ser. No. 12/307,520 is a U.S. national stage of application No. PCT/JP2007/062250, filed on Jun. 18, 2007, the entire contents of which are incorporated herein by reference and priority to which is hereby claimed. Priority under 35 U.S.C. §119(a) and 35 U.S.C. §365(b) is hereby claimed from Japanese Application No. 2006-185444, filed Jul. 5, 2006, the disclosure of which is also incorporated herein by reference.

TECHNICAL FIELD

The present invention relates to an indirect internal reforming solid oxide fuel cell system having an indirect internal reforming solid oxide fuel cell in which a reformer that reforms a hydrocarbon-based fuel, such as kerosene, is disposed in the vicinity of the solid oxide fuel cell.

BACKGROUND ART

In general, a hydrogen-containing gas (a reformed gas) generated by reforming a hydrocarbon-based fuel (a reforming feedstock), such as kerosene and city gas, in a reformer is supplied to a solid oxide fuel cell (hereinafter sometimes called SOFC). Electric power is generated by causing this reformed gas and air to react electrochemically in the SOFC.

Usually, the SOFC is caused to operate at high temperatures of the order of 550° C. to 1000° C.

The steam reforming reaction used in reforming is a reaction involving very large endotherm, the reaction temperature is relatively high, and a high-temperature heat source is necessary. For this reason, there is known an indirect internal reforming SOFC in which a reformer is disposed in the vicinity of the SOFC (in a position where the reformer receives heat radiation from the SOFC) and the reformer is heated by the radiation heat from the SOFC. Also, there is known a practice by which an anode off-gas (a gas discharged from an anode of an SOFC) containing combustible components is burned and the reformer is heated by using this combustion heat as the heat source.

The indirect internal reforming SOFC is described in Patent Document 1.

Patent Document 1: Japanese Patent Laid-Open No. 2002-358997

DISCLOSURE OF THE INVENTION

Problems to be Solved by the Invention

Upon starting-up an indirect internal reforming SOFC system in which a hydrocarbon-based fuel is reformed and used, for a duration until the temperature of a reformer reaches a temperature at which the hydrocarbon-based fuel can be reformed and a reformed gas can be produced by the reformer, hydrogen is supplied to an anode of the SOFC in order to prevent the oxidation of the anode. When it has become possible to produce a reformed gas, the reformed gas can be supplied to the anode. Incidentally, also in the case of a shutdown of the SOFC system, hydrogen is supplied to the anode after it has become impossible to obtain a reformed gas in the reformer.

Hydrogen stored in a cylinder can be used as hydrogen for protecting the anode of the SOFC as described above. In this case, however, storage equipment of hydrogen and resupply of hydrogen are necessary, with the result that the whole system becomes large and procurement of hydrogen cylinders is troublesome. These factors cause a cost increase.

The object of the present invention is to provide an indirect internal reforming SOFC system capable of eliminating the use of hydrogen storage equipment for anode protection at start-up and on other occasions.

Means for Solving the Problems

The present invention provides an indirect internal reforming solid oxide fuel cell system including:
an indirect internal reforming solid oxide fuel cell that has a first reformer which produces a reformed gas from a hydrocarbon-based fuel by using a steam reforming reaction, a solid oxide fuel cell which generates electric power by using the reformed gas obtained in the first reformer, and a container which houses the first reformer and the solid oxide fuel cell, wherein the first reformer is disposed in a position to receive heat radiation from the solid oxide fuel cell; a second reformer which is disposed outside the container and produces a reformed gas by reforming a hydrocarbon-based fuel; and
a line which leads the reformed gas obtained in the second reformer from the second reformer to an anode of the solid oxide fuel cell.

It is preferred that the second reformer be provided with a combustion means for burning a combustible.

It is preferred that this system further includes a line that leads the reformed gas, which has been led from the second reformer to the anode of the solid oxide fuel cell, from the anode to the combustion means.

Advantage of the Invention

The present invention provides an indirect internal reforming SOFC system capable of eliminating the use of hydrogen storage equipment for anode protection at start-up and on other occasions.

BRIEF DESCRIPTION OF THE DRAWING

FIG. 1 is a flow diagram showing an outline of an example of the internal reforming SOFC system of the present invention.

DESCRIPTION OF SYMBOLS

1: Indirect internal reforming SOFC
2: Internal reformer (first reformer)
3: SOFC
4: Module container
11: External reformer (second reformer)
11$a$: Reforming reaction tube
11$b$: Burner
11$c$: Combustion catalyst layer
A: Anode of SOFC
C: Cathode of SOFC

BEST MODE FOR CARRYING OUT THE INVENTION

An embodiment of the present invention will be described below with reference to the drawing. However, the present invention is not limited by this embodiment.

FIG. 1 shows an outline of an example of the indirect internal reforming SOFC system of the present invention.

This system has an indirect internal reforming SOFC 1. The indirect internal reforming SOFC has a reformer (a first reformer) 2 and an SOFC 3 (in the figure, reference character A denotes an anode, and reference character C denotes a cathode). The reformer and the SOFC are disposed within a container (a module container) 4 and modularized. Hereinafter in some cases, the first reformer is referred to as an internal reformer. This system has a reformer (a second reformer) 11 disposed outside the module container 4. Hereinafter in some cases, this reformer is referred to as an external reformer.

The external reformer 11 has a reforming reaction tube 11a in which a reforming reaction is performed. The external reformer 11 has a burner 11b that burns a combustible (in this example, kerosene) as combustibles combustion means. Furthermore, the external reformer 11 has a combustion catalyst layer 11c downstream of the burner 11b ("downstream" with respect to the flow of the burner combustion gas). The combustion catalyst layer is also combustibles combustion means.

In the system described here, kerosene is used as all of the hydrocarbon-based fuel which is to be reformed in the internal reformer, the hydrocarbon-based fuel which is to be reformed in the external reformer, and the combustible which is to be burned in the burner of the external reformer. In both the internal reformer and the external reformer, steam reforming is performed. Kerosene that has been vaporized beforehand and steam are introduced into each of the internal reformer and the external reformer, and kerosene is reformed. Air is used as an oxygen-containing gas which is to be supplied to the cathode of the SOFC and an oxygen-containing gas which is to be used for combustion.

In both the anode and cathode of the SOFC 3, a cell outlet is opened within the module container. That is, the structure is such that both an anode off-gas discharged from the anode-side cell outlet and a cathode off-gas discharged from the cathode-side cell outlet are discharged into the interior of the module container. The module container is kept airtight so that the interior thereof and the exterior thereof (the atmosphere) do not communicate with each other.

[How to Start Up the System]

The system shown in FIG. 1 can be started up as follows, for example.

First, kerosene (liquid state) is supplied as a combustible to the burner 11b, and air is also supplied, whereby the kerosene is burned. The combustion catalyst layer 11c and the reforming reaction tube 11a are heated by this combustion heat.

When the temperature of the reforming reaction tube 11a has reached a temperature at which steam can be introduced (a temperature at which condensation water is not generated), steam is introduced into the reforming reaction tube 11a. Before this temperature is reached, it is unnecessary to introduce anything into the reforming reaction tube. The steam that has left the reforming reaction tube can be discharged to the atmosphere from an open-to-atmosphere line 101 provided downstream of the reformer.

It is possible to generate steam and to superheat steam as required by using combustion heat of an auxiliary burner separately provided.

While steam is being introduced, kerosene that has been vaporized beforehand is introduced into the reforming reaction tube of the external reformer in addition to the steam when the temperature of the reforming reaction tube 11a has reached a temperature at which reforming is possible, whereby steam reforming is performed.

It is possible to vaporize kerosene and to preheat the vaporized kerosene as required using combustion heat of an auxiliary burner separately provided.

The reformed gas obtained in the external reformer is supplied to the anode of the SOFC 3. In this example, the reformed gas is supplied to the anode via a catalytic combustor 21. At this time, it is possible to use a line 102 that supplies the reformed gas obtained from the external reformer to the anode by stopping the use of the open-to-atmosphere line 101. It is necessary only that the gas supplied to the anode have such reducing ability that the anode is protected, and it is unnecessary that the hydrogen concentration of the gas be very high. Therefore, by burning a part of the combustible components of the reformed gas using air in the catalytic combustor 21, it is possible to raise the temperature of the gas supplied to the anode and to increase the volume of the gas. As a result of this, it is possible to shorten the time for heating the SOFC. The air necessary for the combustion in the catalytic combustor 21 can be obtained from a line 103. It is not always necessary that the catalytic combustor 21 be provided.

As required, by using combustion heat of an auxiliary burner separately provided, it is possible to preheat the air supplied to the catalytic combustor 21.

On the other hand, air is supplied to the cathode. In this example, after the air is heated by using combustion heat of an auxiliary burner (not shown) separately provided, the air is supplied to the cathode to heat the SOFC. The air that has heated the SOFC is discharged from the cell outlet of the cathode and heats the internal reformer.

An anode off-gas is discharged from the cell outlet of the anode, a cathode off-gas is discharged from the cell outlet of the cathode, and these are mixed within the module container (hereinafter this mixed gas is sometimes referred to as a mixed off-gas) and discharged from the module. This gas is supplied to upstream of the combustion catalyst layer 11c of the external reformer via line 111. In the combustion catalyst layer, the combustible components of the mixed off-gas burn, and the combustion gas is discharged to the atmosphere from the external reformer. When the temperature of the combustion gas is high, it is also possible to preheat and vaporize other fluids by using this combustion gas.

In this example, for each of the anode and the cathode, the cell outlet is open inside the module container. However, it is also possible to separately take out the anode off-gas and the cathode off-gas to outside the module. In this case, the anode off-gas can be led to the external reformer and burned. The cathode off-gas may or may not be led to the external reformer.

It is possible to stop the combustion by the burner 11b when the heat necessary for reforming in the external reformer can be obtained by the combustion of the mixed off-gas or the anode off-gas.

In this manner, it is possible to heat the SOFC and the internal reformer while keeping the anode in a reducing atmosphere.

When the temperature of the internal reformer 2 has reached a temperature at which reforming is possible, vaporized kerosene and steam are supplied to the internal reformer to generate a reformed gas. Before this temperature is reached, it is unnecessary to introduce anything into the internal reformer. When it is desired to cause a reducing gas to flow in order to protect a reforming catalyst housed in the internal reformer, it is possible to introduce an outlet gas of the catalytic combustor 21 into the internal reformer (the region where the reforming catalyst exists) and to supply a gas discharged from the internal reformer to the anode.

The reformed gas generated in the internal reformer is supplied to the anode. The anode off-gas discharged from the cell outlet of the anode (at this point in time, the reformed gas is discharged substantially as it is) is ignited by an ignitor as appropriate and is burned in the vicinity of the cell outlet. It is possible to further heat the SOFC by this combustion heat. From the module container, the mixed off-gas of the anode off-gas and the cathode off-gas is discharged after combustion. This gas can be discharged to the atmosphere after being heat-utilized as appropriate, for example, in preheating air to be supplied to the cathode. At this time, it is possible to discharge this gas via line 112 by stopping the use of line 111.

When the anode off-gas is taken out of the module container without being burned within the module container, it is possible to burn the anode off-gas by leading the anode off-gas to combustion means separately provided, to heat air to be supplied to the SOFC by heat exchange with this combustion gas, and to heat the SOFC with this air. This combustion gas can be discharged to the atmosphere after further being appropriately heat-utilized as required.

At the point in time when the reformed gas generated in the internal reformer is supplied to the anode, it is possible to stop the production of the reformed gas by the external reformer. That is, the supply of kerosene and steam to the reforming reaction tube 11a can be stopped, and when the supply of kerosene and air to the burner 11b is performed, this supply can be stopped. When the mixed off-gas (or anode off-gas) has been supplied to the combustion catalyst layer 11c of the external reformer and burned, it is possible to stop the supply of the mixed off-gas (or anode off-gas) to the combustion means of the external reformer.

Electric power generation is started when the temperature of the SOFC has reached a temperature at which electric power can be generated, and it is possible to heat the SOFC by the heat generation that electric power generation involves.

In the above-described auxiliary burner, it is possible to burn appropriate combustibles, such as combustibles supplied to the burner provided in the external reformer. It is unnecessary to provide one auxiliary burner for each of the applications, such as generation or superheating of steam, vaporization or preheating of kerosene, and preheating of air, and one auxiliary burner may be used for a plurality of the applications and for all of the applications.

In this manner, the indirect internal reforming SOFC system can be started up and normal operation (rated operation and partial load operation) becomes possible.

[How to Stop the System]

On shutting down the SOFC system, it is possible to adopt the following method, for example.

After the stop of the electric power generation by the SOFC, the external reformer 11 is started up and a reformed gas is produced, and this reformed gas is caused to flow to the anode. Because on the occasion of the shutdown it is unnecessary to heat the SOFC, even in a system having catalytic combustor 21, it is unnecessary to perform combustion in the catalytic combustor.

On the other hand, air is kept flowing on the cathode side. The preheating of the air can be stopped as appropriate.

The start-up of the external reformer can be performed in the same manner as with the start-up of the system.

When the reformed gas generated in the external reformer has flown to the anode, it is possible to stop the supply of the vaporized kerosene and steam to internal reformer 2. When the supply of these has been stopped, the combustion of the anode off-gas at the cell outlet stops. There is a possibility that the reformed gas generated in the external reformer burns at the cell outlet of the anode. However, it is possible to make heat value of the reformed gas generated in the external reformer smaller than heat value of the reformed gas generated in the internal reformer and it is possible to cool the SOFC, and moreover, the internal reformer with the air on the cathode side.

The mixed off-gas (or the anode off-gas) is supplied to external reformer 11 via line 111, subjected to combustion treatment in combustion catalyst layer 11c, and discharged to the atmosphere.

When it is necessary to protect the reforming catalyst housed in the internal reformer on the occasion of the shutdown, it is possible to supply the reformed gas generated in the external reformer to the anode via the internal reformer (the region where the reforming catalyst of the internal reformer exists).

[Indirect Internal Reforming SOFC]

The indirect internal reforming SOFC has an internal reformer and an SOFC. These are housed in one module container and modularized. The internal reformer is disposed in a place where the internal reformer receives heat radiation from the SOFC. This arrangement ensures that the internal reformer is heated by the heat radiation from the SOFC during electric power generation. It is also possible to heat the SOFC by burning the anode off-gas discharged from the SOFC at the cell outlet.

It is preferred that the internal reformer be disposed in a position where direct radiation heat transfer from the SOFC to the outer surface of the internal reformer is possible. Therefore, it is preferred that any shading substance be not substantially disposed between the internal reformer and the SOFC, that is, it is preferred to make the region between the internal reformer and the SOFC be a space. Also, it is preferred that the distance between the internal reformer and the SOFC be as short as possible.

Each feed gas is supplied to the internal reformer or the SOFC after being appropriately preheated as required.

It is possible to use an appropriate container capable of housing the SOFC and the internal reformer as the module container. An appropriate material having the resistance to the environment in which the module container is used, for example, stainless steel, can be used as the material for the module container. Connection ports are provided in the container for gas interfacing and the like as appropriate.

Particularly when the cell outlet is open inside the module container, it is preferred that the module container have airtightness so that the interior thereof and the outside thereof (the atmosphere) do not communicate with each other.

[Internal Reformer (First Reformer)]

The internal reformer produces a reformed gas containing hydrogen from a hydrocarbon-based fuel by using a steam reforming reaction. In the internal reformer, a steam reforming reaction may be performed or autothermal reforming in which a steam reforming reaction is accompanied with a partial oxidation reaction may be performed. From the standpoint of the efficiency of electric power generation by the SOFC, it is preferred that a partial oxidation reaction should not take place. Also in autothermal reforming, steam reforming becomes predominant and hence the overall reforming reaction is endothermic. And the heat necessary for the reforming reaction is supplied from the SOFC.

The internal reformer can be provided with a reforming catalyst having steam reforming activity. A steam reforming catalyst that has steam reforming activity and substantially does not have partial oxidation reforming activity can be used as the reforming catalyst or an autothermal reforming catalyst that combines partial oxidation activity and steam reforming activity may be used.

It is possible to supply the internal reformer (the reforming catalyst layer) with a hydrocarbon-based fuel (vaporized beforehand as required) and steam and, furthermore as required, an oxygen-containing gas, such as air, each independently or mixed beforehand as appropriate. The reformed gas is supplied to the anode of the SOFC.

[SOFC]

The reformed gas obtained from the internal reformer is supplied to the anode of the SOFC. On the other hand, an oxygen-containing gas, such as air, is supplied to the cathode of the SOFC. The SOFC generates heat as a result of electric power generation, and the heat transfers in a radiant manner from the SOFC to the reformer. Thus, the SOFC exhaust heat is used for the endotherm of a reforming reaction. Gas interfacing and the like are appropriately performed by using piping and the like.

It is possible to use an SOFC by making an appropriate selection from publicly known SOFCs having various shapes, such as planner type and tubular type. In the SOFC, generally, oxygen-ion conductive ceramics or proton-ion conductive ceramics are used as an electrolyte.

Although the SOFC may be a single cell, practically, a stack in which a plurality of single cells are arrayed (may sometimes be called a bundle in the case of the tubular type; the stack in this specification includes also a bundle) is preferably used. In this case, one stack may be used or a plurality of stacks may be used.

[External Reformer (Second Reformer)]

The external reformer is disposed outside the module container of the indirect internal reforming SOFC.

The external reformer is intended for producing a hydrogen-containing reformed gas by reforming a hydrocarbon-based fuel when a reducing reformed gas cannot be produced by the internal reformer and for causing the hydrogen-containing reformed gas to flow to the anode of the SOFC in order to protect the anode from oxidation. The external reformer is used, for example, for a duration until the temperature of the internal reformer reaches a temperature at which the internal reformer becomes possible to reform the hydrocarbon feedstock upon starting-up the system and for a duration from the stop of electric power generation to the stop of the system.

The external reformer can be provided with combustion means that burns combustibles. It is possible to use the heat of this combustion as the heat necessary for steam reforming (including autothermal reforming). It is possible to perform partial oxidation reforming by using a partial oxidation reforming catalyst in the external reformer. Also in this case, it is possible to use the combustion heat in the above-described combustion means in order to heat the reforming catalyst until a temperature is reached at which catalytic activity develops.

As the combustion means, a burner and a catalytic combustor (a combustion catalyst) can be used as appropriate and two or more kinds of combustion means can be used in combination.

The external reformer can be provided with a catalyst having steam reforming activity or a catalyst having partial oxidation reforming activity. As the reforming catalyst, it is possible to use a steam reforming catalyst having steam reforming activity and substantially not having partial oxidation reforming activity, a partial oxidation reforming catalyst having partial oxidation reforming activity and substantially not having steam reforming activity, or an autothermal reforming catalyst combining partial oxidation reforming activity and steam reforming activity.

In the external reformer, it is necessary only that a reducing gas adequate for anode protection be capable of being produced. For example, it is necessary only that a gas whose hydrogen concentration is on the order of not less than 5 mol % be capable of being supplied to the anode ("mol %" is on a dry base).

Therefore, the capacity of the external reformer may be smaller than the capacity of the internal reformer. That is, the amount of the reforming catalyst of the external reformer may be smaller than the amount of the reforming catalyst of the internal reformer, and the ratio of the amount of the reforming catalyst of the external reformer to the amount of the reforming catalyst of the internal reformer may be on the order of $1/10$ to $1/2$. It is preferred that this ratio be not less than $1/10$ from the standpoint of shortening the time required for heating an SOFC, and it is preferred that this ratio be not more than $1/2$ from the standpoint of preventing an increase in the size of the whole system.

If a hydrocarbon-based fuel to be reformed in the external reformer is of the same kind as the hydrocarbon-based fuel used in the internal reformer as the feedstock for reforming, this is preferable because the supply source can be shared.

[Line for Leading the Reformed Gas of the External Reformer from the External Reformer to the Anode of the SOFC]

By using this line, the reformed gas generated in the external reformer, which is a reducing gas, is supplied to the anode of the SOFC. The reformed gas generated in the external reformer may be supplied directly from the external reformer to the anode. Alternatively, as required, the reformed gas generated in the external reformer may be supplied to the anode via the interior of the internal reformer (region where the reforming catalyst is present) in order to protect the reforming catalyst of the internal reformer.

This line can be formed by connecting the reforming reaction tube outlet of the external reformer and the anode of the SOFC (for example, the anode-side gas interface port of an SOFC stack) by using publicly known piping members as appropriate.

[Line for Leading the Reformed Gas of the External Reformer, Which has been Led to the Anode, from the Anode to the Combustion Means of the External Reformer]

The reformed gas that has been generated in the external reformer and led to the anode is discharged from the anode. This anode off-gas may be mixed with the cathode off-gas inside the module to become a mixed off-gas. This mixed off-gas or the anode off-gas can be discharged to the atmosphere after being treated in an off-gas treatment device (a combustion device or the like) separately provided. However, it is preferred that this mixed off-gas or the anode off-gas be treated by being burned in the combustion means provided in the external reformer. This is because it is possible to treat this off-gas while effectively utilizing heat value of this gas without providing a separate off-gas treatment device.

When the concentrations of combustible components of this mixed off-gas or the anode off-gas are low and there is a possibility that the mixed off-gas or the anode off-gas cannot be stably burned with a burner, a combustion catalyst can be used in the combustion means provided in the external reformer. As the combustion catalyst, it is possible to make an appropriate selection from publicly known combustion catalysts.

Both a burner and a combustion catalyst can be provided in the external reformer as combustion means. For example, a combustion catalyst layer is provided downstream of the burner ("downstream" with respect to the flow of the burner combustion gas) to make the combustion gas of the burner pass through the combustion catalyst layer. In such constitution, it is possible to use the burner in the early stage of a start-up; and when reformed gas is generated by the external reformer, it is possible to feed the reformed gas to the anode and return the mixed off-gas or the anode off-gas to the combustion catalyst layer, whereby the mixed off-gas or the anode off-gas is catalytically combusted. On this occasion, if the reforming heat is enough only with the combustion heat of the mixed off-gas or the anode off-gas, it is possible to stop the combustion by the burner.

This line can be formed by connecting the anode (for example, the anode-side gas interface port of the SOFC stack into which the reformed gas of the external reformer is not introduced) and the combustion means provided in the external reformer by using publicly known piping members as appropriate. When the cell outlet of the anode is open inside the modularized indirect internal reforming SOFC, it is necessary only that the outlet of the module container and the combustion means provided in the external reformer be connected together.

[Hydrocarbon-Based Fuel]

As each of hydrocarbon-based fuels that are reformed in the internal reformer and the external reformer, it is possible to use as appropriate a compound whose molecules contain carbon and hydrogen (may also contain other elements, such as oxygen) or a mixture of such compounds publicly known as a feedstock for a reformed gas in the field of an SOFC system. It is possible to use compounds, such as hydrocarbons, alcohols and the like whose molecules contain carbon and hydrogen. For example, there may be used hydrocarbon fuels, such as methane, ethane, propane, butane, natural gas, LPG (liquefied petroleum gas), city gas, gasoline, naphtha, kerosene and gas oil, alcohols, such as methanol and ethanol, and ethers, such as dimethyl ether. Among these, kerosene is preferable because kerosene is readily available both for industrial use and for consumer use and can be easily handled. Furthermore, because kerosene is reformed at a relatively high temperature, it takes a relatively long time to start up the reformer (the internal reformer). For this reason, the advantages of the present invention are especially remarkable when kerosene is used as the hydrocarbon-based fuel.

[Combustible (Fuel in the Combustion Means of the External Reformer)]

It is possible to use a combustible to be burned by the combustion means of the external reformer by making selection as appropriate from combustibles capable of being burned by the combustion means that is used. From the standpoint of the ease of handling, it is preferred that a gaseous or liquid combustible be used. Particularly, liquid combustibles, such as kerosene, are preferable because the handling and storage are easy. When a gaseous combustible is used, it is preferable to use those which are continuously supplied from the outside and do not require storage equipment, such as city gas.

If a hydrocarbon-based fuel to be burned in the external reformer is of the same kind as the hydrocarbon-based fuel used in the internal reformer as the feedstock for reforming or the hydrocarbon-based fuel used in the external reformer as the feedstock for reforming, this is preferable because the supply source can be shared.

[Reforming Catalyst]

Publicly known catalysts can be used as each of the steam reforming catalyst or autothermal reforming catalyst used in the internal reformer and the partial oxidation reforming catalyst, steam reforming catalyst or autothermal reforming catalyst used in the external reformer. Examples of the partial oxidation reforming catalyst include platinum-based catalysts, examples of the steam reforming catalyst include ruthenium-based and nickel-based catalysts, and examples of the autothermal reforming catalyst include rhodium-based catalysts.

The temperature at which a partial oxidation reforming reaction can proceed is, for example, not less than 200° C. and the temperature at which a steam reforming reaction can proceed is, for example, not less than 400° C.

A description will be given below of conditions for the rated operation for each of steam reforming and autothermal reforming.

The reaction temperature at which steam reforming is possible is, for example, in the range of 450° C. to 900° C., preferably in the range of 500° C. to 850° C., more preferably in the range of 550° C. to 800° C. The quantity of steam introduced into the reaction system is defined as the ratio of the number of moles of water molecules to the number of moles of carbon atoms contained in a feedstock for hydrogen production (the steam/carbon ratio), and this value is preferably 1 to 10, more preferably 1.5 to 7, most preferably 2 to 5. When the feedstock for hydrogen production is a liquid, the space velocity (LHSV, liquid hourly space velocity) at this time can be expressed by NB where the flow rate of the feedstock for hydrogen production in a liquid state is A (L/h) and the volume of the catalyst layer is B(L), and this value is set preferably in the range of 0.05 to 20 $h^{-1}$, more preferably in the range of 0.1 to 10 $h^{-1}$, most preferably in the range of 0.2 to 5 $h^{-1}$.

In autothermal reforming, an oxygen-containing gas is added to the feedstock in addition to steam. Although the oxygen-containing gas may be pure oxygen, air is preferable because air is easily available. An oxygen-containing gas can be added to balance the endothermic reaction that steam reforming reaction involves and to obtain an amount of heat such that the temperature of the reforming catalyst layer and the SOFC can be maintained or raised. As the ratio of the number of moles of oxygen molecules to the number of moles of carbon atoms contained in a feedstock for hydrogen production (the oxygen/carbon ratio), the quantity of an oxygen-containing gas added is preferably 0.005 to 1, more preferably 0.01 to 0.75, most preferably 0.02 to 0.6. The reaction temperature at which autothermal reforming occurs is, for example, in the range of 400° C. to 900° C., preferably in the range of 450° C. to 850° C., more preferably in the range of 500° C. to 800° C. When the feedstock for hydrogen production is a liquid, the space velocity (LHSV) at this time is selected preferably in the range of 0.05 to 20, more preferably in the range of 0.1 to 10, most preferably in the range of 0.2 to 5. The quantity of steam introduced into the reaction system as the steam/carbon ratio is preferably 1 to 10, more preferably 1.5 to 7, most preferably 2 to 5.

[Other Devices]

In addition to the above-described devices, publicly known component elements of an SOFC system can be appropriately provided as required. Examples of such component elements include a desulfurizer for desulfurizing hydrocarbon-based fuels; a vaporizer for vaporizing liquid; a pressurizing means for pressurizing various kinds of fluids, such as a pump, a compressor and a blower; a flow rate control means and flow path shutoff/switching means for controlling the flow rates of fluids or shutting-off/switching the flows of fluids, such as valves; a heat exchanger for performing heat exchange or heat recovery; a condenser for condensing a gas; a heating/warming means for externally heating various kinds of equipment with steam or the like; a storage means of hydrocarbon-based fuels or combustibles; air or electrical system for instrumentation; signal system for control; a controller; and an electrical system for output or for power.

As described above, in the indirect internal reforming solid oxide fuel cell system that uses a hydrocarbon-based fuel as the feedstock, by supplying a reformed gas from the external reformer to the solid oxide fuel cell at start-up and at shutdown, it is possible to protect the anode of the solid oxide fuel cell from oxidation without using hydrogen purified in other places or the like. The reformed gas discharged from the solid oxide fuel cell can be burned as a heat source in the external reformer and rendered harmless without the necessity to install separate off-gas treatment equipment.

INDUSTRIAL APPLICABILITY

The indirect internal reforming SOFC of the present invention can be used, for example, in a stationary or mobile electric power generation system and in a cogeneration system.

The invention claimed is:

1. A method of operating an indirect internal reforming solid oxide fuel cell system comprising:
providing the indirect internal reforming solid oxide fuel cell system, the system comprising:
an indirect internal reforming solid oxide fuel cell comprising:
an internal reformer for producing a reformed gas from a hydrocarbon-based fuel by using a steam reforming reaction,
a solid oxide fuel cell for generating electric power by using the reformed gas obtained in the internal reformer, and
a container for containing the internal reformer and the solid oxide fuel cell,
the internal reformer being disposed in a position to receive heat radiation from the solid oxide fuel cell;
an external reformer for producing a reformed gas by reforming a hydrocarbon-based fuel, the external reformer being disposed outside the container; and
a line for leading the reformed gas obtained in the external reformer from the external reformer to an anode of the solid oxide fuel cell, wherein the internal reformer is connected to the solid oxide fuel cell not via the external reformer, and the external reformer is connected to the solid oxide fuel cell not via the internal reformer;
feeding the reformed gas produced by the external reformer to the anode of the solid oxide fuel cell only when starting up and shutting down the system;
feeding the reformed gas produced by the internal reformer to the anode of the solid oxide fuel cell only when a temperature of the internal reformer is a temperature at which reforming is possible in the internal reformer.

2. The method according to claim 1, wherein the external reformer is equipped with a combustion means for combusting a combustible.

3. The method according to claim 2, wherein the indirect internal reforming solid oxide fuel cell system further comprises a line for leading the reformed gas, which has been led from the external reformer to the anode of the solid oxide fuel cell, from the anode to the combustion means.

4. The method according to claim 1, wherein the external reformer comprises a burner and a combustion catalyst.

5. The method according to claim 4, wherein the combustion catalyst is provided downstream of the burner.

6. The method according to claim 4, wherein anode-off gas or mixed off-gas from the solid oxide fuel cell is provided to the combustion catalyst of the external reformer.

7. The method according to claim 6, wherein when heat provided by combustion of the anode-off gas or mixed-off gas is sufficient for reforming in the external reformer, the burner is stopped.

8. The method according to claim 1, wherein at a time when the reformed gas produced by the internal reformer is fed to the anode of the solid oxide fuel cell, the production of reformed gas in the external reformer is stopped.

9. The method according to claim 1, wherein said temperature is not less than 200° C.

10. The method according to claim 1, wherein said temperature is 400° C. to 900° C.

* * * * *